A. H. GELLNESS.
FRUIT PICKER.
APPLICATION FILED AUG. 30, 1912.
1,052,238.
Patented Feb. 4, 1913.
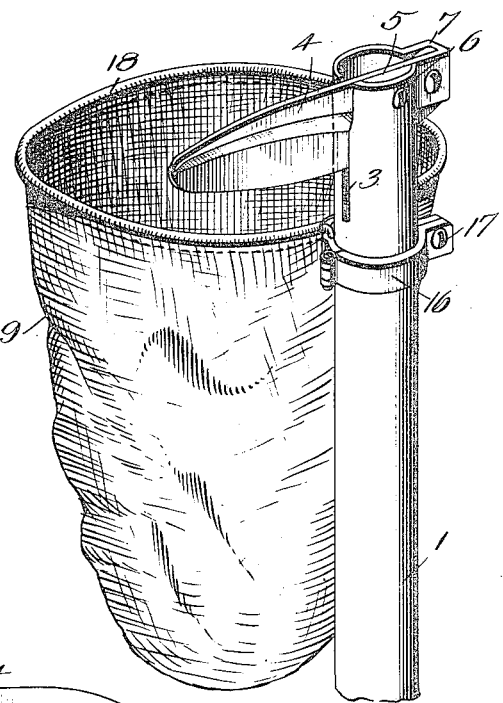
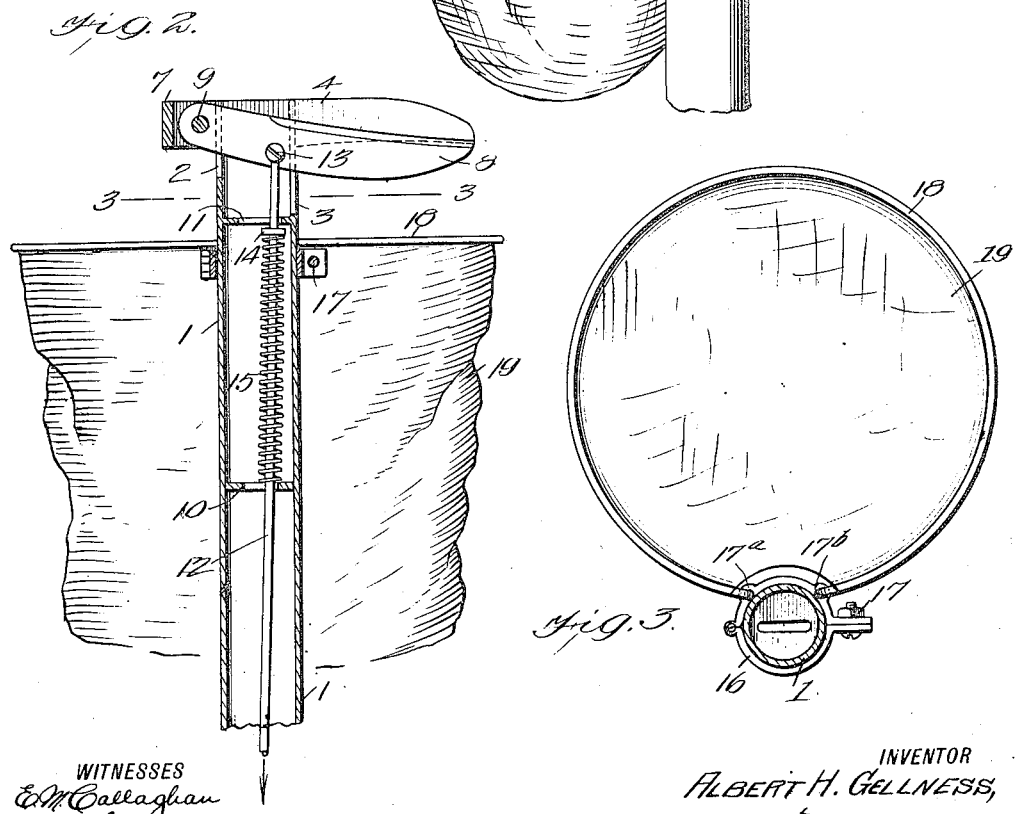
WITNESSES
E. M. Callaghan
L. A. Stanley
INVENTOR
Albert H. Gellness,
BY Munn & Co.
ATTORNEYS

UNITED STATES PATENT OFFICE.

ALBERT HERMAN GELLNESS, OF SUTTONS BAY, MICHIGAN.

FRUIT-PICKER.

1,052,238.　　　　　Specification of Letters Patent.　　Patented Feb. 4, 1913.

Application filed August 30, 1912. Serial No. 717,878.

*To all whom it may concern:*

Be it known that I, ALBERT H. GELLNESS, a citizen of the United States, and a resident of Suttons Bay, in the county of Leelanau and State of Michigan, have made certain new and useful Improvements in Fruit-Pickers, of which the following is a specification.

My invention relates to improvements in fruit picking devices, more especially devices for picking apples, and it consists in the combinations, constructions and arrangements herein described and claimed.

An object of my invention is to provide a device for picking fruit which will prevent bruising of the fruit.

A further object of my invention is to provide a device by means of which fruit in the highest part of the tree may be picked as well as that in the lowest.

A further object of my invention is to provide a simple device which can be manufactured cheaply for accomplishing the above named results.

Other objects and advantages will appear in the following specification and the novel features of the device will be particularly pointed out in the appended claims.

My invention is illustrated in the accompanying drawings forming a part of this application and in which—

Figure 1 is a perspective view of the upper portion of the fruit picker. Fig. 2 is a section through a portion of the device, and Fig. 3 is a section on the line 3—3 of Fig. 2.

In carrying out my invention I make use of a hollow handle or rod 1. This rod may be of any suitable material. At the upper end of the rod I provide the slots 2 and 3 respectively extending downwardly from the ends. Disposed in the slots is a fixed blade 4, a filler 5 being disposed between the blade and the curved portion of the hollow rod and being held in place by means of a screw 6. This filler forms a bearing surface for the blade. The blade 4 as may be seen from Fig. 1, is bent laterally and back upon itself as shown at 7, terminating adjacent to the handle 1.

Disposed within the slots 2 and 3 and arranged to coöperate with the fixed blade 4 is a movable blade 8. One end of this movable blade extends between the sides of the bent portion 7 to which it is pivoted by means of a screw bolt 9.

Within the handle 1 are two partitions, a lower one which is shown at 10 and an upper one at 11. These partitions are provided with openings arranged to receive a rod 12. The latter is pivotally attached at 13 to the blade 8 and has a collar 14 disposed below the upper partition 11. A spiral spring 15 bears on the collar at one end and on the lower partition 10 at the other end. The openings in the partitions are large enough to permit the free movement of the rod 12, but will not permit the passage of the spring 15 nor the collar 14.

Secured to the outer portion of the hollow handle 1 is a hinged collar 16, the parts of which are arranged to be secured together by means of a fastening device such as the screw bolt 17, see Fig. 3. This collar is provided with a pair of curved portions 17ª and 17ᵇ respectively, see Fig. 3, arranged to receive the ends of a circular frame wire 18, so as to hold the ends of this frame wire firmly between the collar and the handle 1. The frame wire forms the top edge of a receptacle 19. In the present instance I have illustrated the receptacle as being composed of a bag of flexible material such as canvas.

From the foregoing description of the various parts of the device the operation thereof will be readily understood.

In picking the fruit the handle with the bag attached thereto is raised and the rod 12 which extends through the lower end of the handle is grasped and pulled downwardly. This causes the downward movement of the lower blade 8 against the tension of the spring 15. The blades are then slipped over the stem of the apple or other fruit and the mere releasing of the rod 12 is sufficient to cause the severing of the stem of the fruit by means of the reaction of the spring 15. The fruit drops into the bag 19 and then may be lowered to the ground.

It will be seen that this device prevents the bruising of the fruit. It is simple in construction and positive in action. If for any reason the spring 15 should fail to act, of course, the rod 12 may be pushed upwardly thereby moving the lower blade so as to effect the cutting action. But this is not likely to happen since the spring 15 may be made of material which will not wear out under continual use.

I claim;

1. In a fruit picker, a hollow rod provided with a pair of perforated partitions, an operating rod extending the length of the hollow rod and arranged to pass through the perforations in said partitions, a fixed blade secured to the top of the hollow rod, a movable blade pivotally secured to said fixed blade, said movable blade being pivotally connected to said slidable rod, a collar disposed on said rod adjacent to one of said partitions and a spiral spring surrounding said rod and arranged to bear on said collar at one end and one of said partitions at the other end.

2. In a fruit picker, a hollow handle provided with a pair of perforated partitions near one end thereof and having a pair of slots extending inwardly from the end, a stationary blade disposed within the slots, a filler between the blade and one side of said handle, means for securing said filler and said blade to said handle, said stationary blade secured to the handle and having a U-shaped bend at one end, a movable blade also disposed within said slots and having one end pivoted between the arms of said U-shaped bend, a rod pivotally secured to said movable blade and extending through the perforations in said partitions, a collar carried by the rod and engaging one of said partitions, and a spiral spring surrounding the rod, one end of said spiral spring engaging said collar and the other end bearing on one of said partitions.

ALBERT HERMAN GELLNESS.

Witnesses:
    Marcus Hoyt,
    William Leo, Sr.